April 14, 1925.  1,533,522
R. W. TADD
ADJUSTABLE DIAPHRAGM PLATE
Filed Sept. 4, 1923

INVENTOR
Roy W. Tadd
BY
ATTORNEY.

Patented Apr. 14, 1925.

1,533,522

UNITED STATES PATENT OFFICE.

ROY W. TADD, OF LOS ANGELES, CALIFORNIA.

ADJUSTABLE DIAPHRAGM PLATE.

Application filed September 4, 1923. Serial No. 660,696.

*To all whom it may concern:*

Be it known that I, ROY W. TADD, a citizen of the United States, residing at Los Angeles, in the county of Los Angeles and State of California, have invented new and useful Improvements in Adjustable Diaphragm Plates, of which the following is a specification.

My invention relates to valves and particularly to control and regulating valves for acetylene torches, and the general object thereof is to provide improved clamping means for the diaphragm of such valves, by means of which the diaphragm may be adjusted and clamped in such manner as to maintain it bowed outwardly to prevent collapsing thereof under the influence of the valve springs, thus increasing the life of the diaphragm and eliminating friction burn in the valve nozzle.

Other objects and advantages will appear hereinafter and while I show herewith and will describe a preferred form of my invention, I desire it to be understood that I do not limit myself to such preferred form but that various changes and adaptations may be made therein without departing from the spirit of my invention as hereinafter claimed.

Referring to the drawing.

Figure 1:
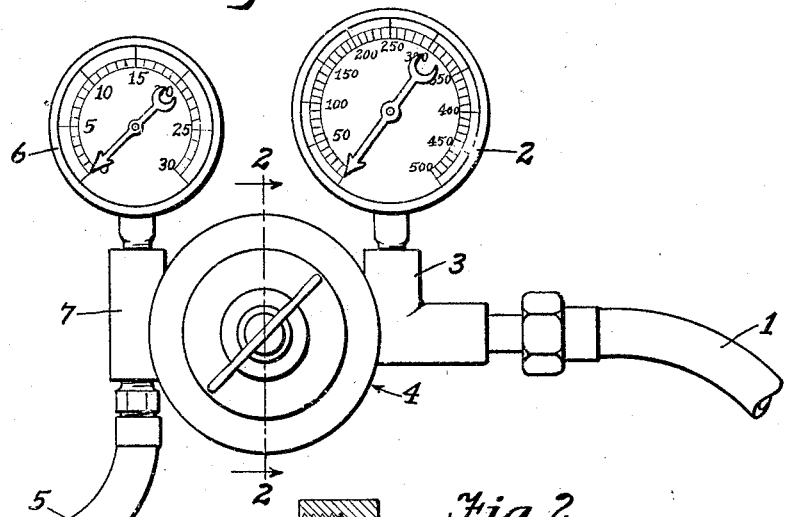
Fig. 1 is a side elevation of an acetylene torch embodying a valve constructed in accordance with my invention.
Figure 2:
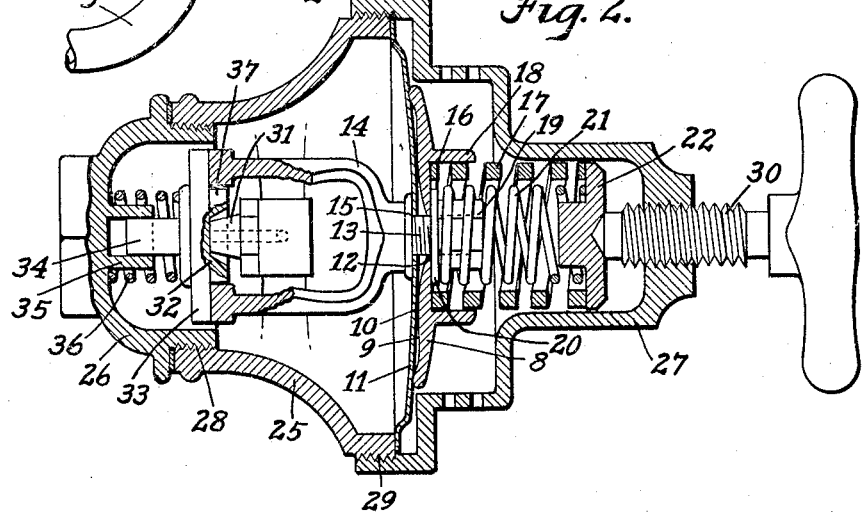
Fig. 2 is a longitudinal section of my valve taken on line 2—2 of Fig. 1.
Figure 3:
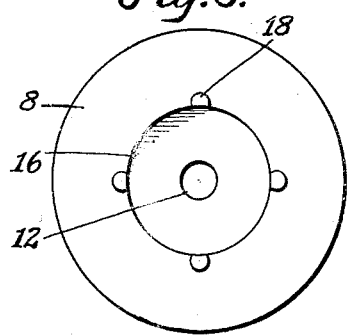
Fig. 3 is a side view of the diaphragm clamping disk.
Figure 4:
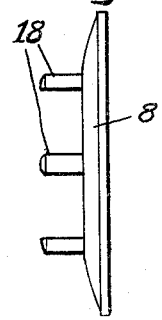
Fig. 4 is an edge view of said disk.

In the drawing 1 indicates a pipe leading from an acetylene tank; 2 a pressure gauge for indicating the pressure in the tank connected to said pipe by connection 3; 4 a control and regulating valve connected to said pipe 1; 5 a pipe leading to a torch nozzle; and 6 a pressure gauge for indicating the torch pressure, said pipe 5 and said gauge 6 being connected by connection 7 to the valve 4.

The valve 4 is of standard construction with the exception of my diaphragm clamping disk 8. The inner face 9 of said disk is of general concave formation but a portion 10 thereof between its center and periphery slightly convex. Said concave face fits against the valve diaphragm 11. Said disk is provided with a central opening 12 to receive the threaded shank 13 of the valve yoke 14 which yoke has a shoulder 15 which fits against the inner face of said diaphragm. The outer face of the disk 8 has a central recess 16 to receive the inner end of the outer diaphragm spring 17 and lugs 18 project outwardly from the disk at the edge of said recess to center said inner end of said spring within said recess. A nut 19 screws on the outer end of the threaded shank 13 against the outer side of the disk 8 or against the surface of the recess 16, said nut being provided with an annular flange 20 at its base against which flange bears the inner end of the inner diaphragm spring 21 which surrounds the body of said nut. The outer ends of springs 17 and 21 bear against a head 22.

The valve casing is made in three sections, a body section 25 and end sections 26 and 27, the end section 26 being screw seated in one end of section 25 at 28 and the end section 27 being screw seated on the other end of the body section as at 29. The diaphragm 11 rests against the end of section 25 on which end section 27 seats. A hand screw 30 is seated in the outer end of casing section and engages the head 22 for adjusting the tension of springs 19 and 21 against the disk 8 and the diaphragm 11.

The connection 3 extends into the casing section 25 and is formed with a conical nozzle 31 on its inner end adapted to seat in a spring mounted seat 32 in a head 33, said seat being formed with a stud 34 slidably mounted in a bearing 35 in the end of the casing section 26, and a spring 36 surrounds said bearing and stud and bearing at its ends against the end wall of said casing section and said head respectively for normally holding said head against the end of yoke 14 and the reduced portion 37 of said head within the end of the yoke.

The springs 17 and 21 are adjusted so that the yoke 14 will hold the head 23 in position with the nozzle 31 slightly off its seat 32 so that the proper amount of gas will pass out of said nozzle and between the nozzle and said seat into the valve casing. When the pressure of the gas in the valve casing becomes excessive it expands the diaphragm 11 outwardly which moves the yoke 14 outwardly and the spring 36 forces the head 33 in the same direction so that the nozzle 31 seats firmly within the seat 32, thus shutting off the gas so that it cannot enter the valve casing.

The collapsing of diaphragms in other valves causes the yoke 14 to force the head 23 and the seat 32 away from the nozzle 31 so that the gas rushing out of the nozzle and from between the nozzle and the seat causes friction burn of the nozzle and wearing of the same, which renders the valve ineffective.

By the use of my disk 8, collapsing of the diaphragm is prevented. Any loss of resiliency of the diaphragm may be taken up by tightening the nut 19, which draws the diaphragm outwardly into the concavity 9 of the disk, the convex portion 10 engaging the diaphragm to assist the disk in firmly clamping the diaphragm.

I claim as my invention:

1. In a valve as disclosed, in combination with the regulating diaphragm thereof, means for adjusting said diaphragm to prevent collapsing thereof.

2. In a valve as disclosed, in combination with the regulating diaphragm thereof, a concaved disk fitting against said diaphragm, springs engaging said disk, means connected to said diaphragm for normally holding the valve open under the influence of said springs, and means for drawing the diaphragm into the concavity of said disk to take up loss of resiliency of the diaphragm.

3. In a valve as disclosed, in combination with the regulating diaphragm thereof, a concaved disk fitting against said diaphragm, springs engaging said disk, a yoke formed with a threaded shank extending through said diaphragm and said disk, a nut screwing on said shank against the disk for drawing said diaphragm into the concavity of the disk to take up loss of resiliency of the diaphragm, a valve head engaged by said yoke whereby the valve is normally held open under the influence of said springs, and means engaging said head for closing the valve when the spring pressure of said yoke is relieved from said head by excessive fluid pressure in the valve acting against said diaphragm.

4. In a valve as disclosed, in combination with the regulating diaphragm thereof, a concaved disk fitting against said diaphragm springs engaging said disk, means connected to said diaphragm for normally holding the valve open under the influence of said springs, and means for drawing the diaphragm into the concavity of said disk to take up the loss of resiliency of the diaphragm, the concaved face of the disk being slightly convex between its center and periphery to enable the diaphragm to be firmly clamped in the concaved face of the disk, and means for closing the valve when the spring pressure is overcome by the excessive fluid pressure in the valve acting upon said diaphragm.

ROY W. TADD.